United States Patent
Hsu (12)

(10) Patent No.: US 6,246,319 B1
(45) Date of Patent: Jun. 12, 2001

(54) LEVER BAR ACTIVATION DETECTING STRUCTURE

(75) Inventor: Tsun-Tying Hsu, Taoyuan (TW)

(73) Assignee: Index Electronic Co., Ltd., Taoyuan (TW)

( * ) Notice: Subject to any disclaimer, the term of this patent is extended or adjusted under 35 U.S.C. 154(b) by 0 days.

(21) Appl. No.: 09/461,769

(22) Filed: Dec. 15, 1999

(30) Foreign Application Priority Data

Dec. 16, 1998 (TW) ................................................ 87220915

(51) Int. Cl.[7] ...................................................... B60Q 1/44
(52) U.S. Cl. ............................ 340/479; 340/468; 335/205
(58) Field of Search ..................................... 340/467, 468, 340/479; 362/106, 464; 180/205, 206; 200/61.12, 61.87; 335/207, 205

(56) References Cited

U.S. PATENT DOCUMENTS 4,395,603 * 7/1983 Lauzier ................................. 340/432
4,896,138 * 1/1990 Nickols ................................. 340/479
5,704,707 * 1/1998 Gebelein et al. ..................... 340/479

\* cited by examiner

Primary Examiner—Van T. Trieu
(74) Attorney, Agent, or Firm—Varndell & Varndell, PLLC

(57) ABSTRACT

Lever bar activation detecting structure including a lever bar and a lever bar pivot seat with which the lever bar is pivotally connected. A magnet and a magnetic switch are respectively disposed on the lever bar and the pivot seat opposite to each other. When the lever bar is pressed, the magnet is moved relative to the magnetic switch so that the magnetic switch is energized to generate a signal which is detected and identified by a controlling unit for turning on an indicating light. The magnet and magnetic switch have excellent waterproof effect and the structure an be easily assembled to lower cost. The detecting structure is used for detecting the braking operation of an electric two-wheel vehicle, especially for an electric bicycle.

5 Claims, 5 Drawing Sheets

LEVER BAR ACTIVATION DETECTING STRUCTURE

BACKGROUND OF THE INVENTION

The present invention relates to a lever bar activation detecting structure used for detecting the braking operation of an electric two-wheel vehicle, especially for an electric bicycle. The detecting structure has less components and can be easily assembled. Moreover, the structure has excellent waterproof effect and is able to accurately detect the braking signal.

Many kinds of electric bicycles have been developed. However, these electric bicycles are still in a tested stage. Many parts of the electric bicycle still need to be improved for achieving better function. For example, the braking operation detecting switch of the existent electric bicycle is composed of numerous complicated components which are interconnected by mechanical measures. It is troublesome to assemble these components and thus the manufacturing cost is high. The most serious shortcoming of such switch is that it has very poor waterproof effect Unless a waterproof cover is added to the switch, the switch will have almost zero waterproof effect. This is especially critical to a light weight electric bicycle which requires that the respective parts be light and easily assembled and disassembled.

SUMMARY OF THE INVENTION

It is therefore a primary object of the present invention to provide a lever bar activation detecting structure used for detecting the braking operation of an electric two-wheel vehicle, especially for an electric bicycle. The detecting structure has less components and can be easily assembled. Moreover, the structure has excellent waterproof effect and is able to accurately detect the braking signal.

According to the above object, the lever bar activation detecting structure of the present invention includes a lever bar and a lever bar pivot seat with which the lever bar is pivotally connected. A magnet and a magnetic switch are respectively disposed on the lever bar and the pivot seat opposite to each other. When the lever bar is pressed, the magnet is moved relative to the magnetic switch so that the magnetic switch is energized to generate a signal for a controlling unit to detect the signal and turn on an indicating light. The magnet and magnetic switch have excellent waterproof effect and the structure can be easily assembled to lower cost.

The present invention can be best understood through the following description and accompanying drawings wherein:

DETAILED DESCRIPTION OF THE PREFERRED EMBODIMENT

Figure 1:
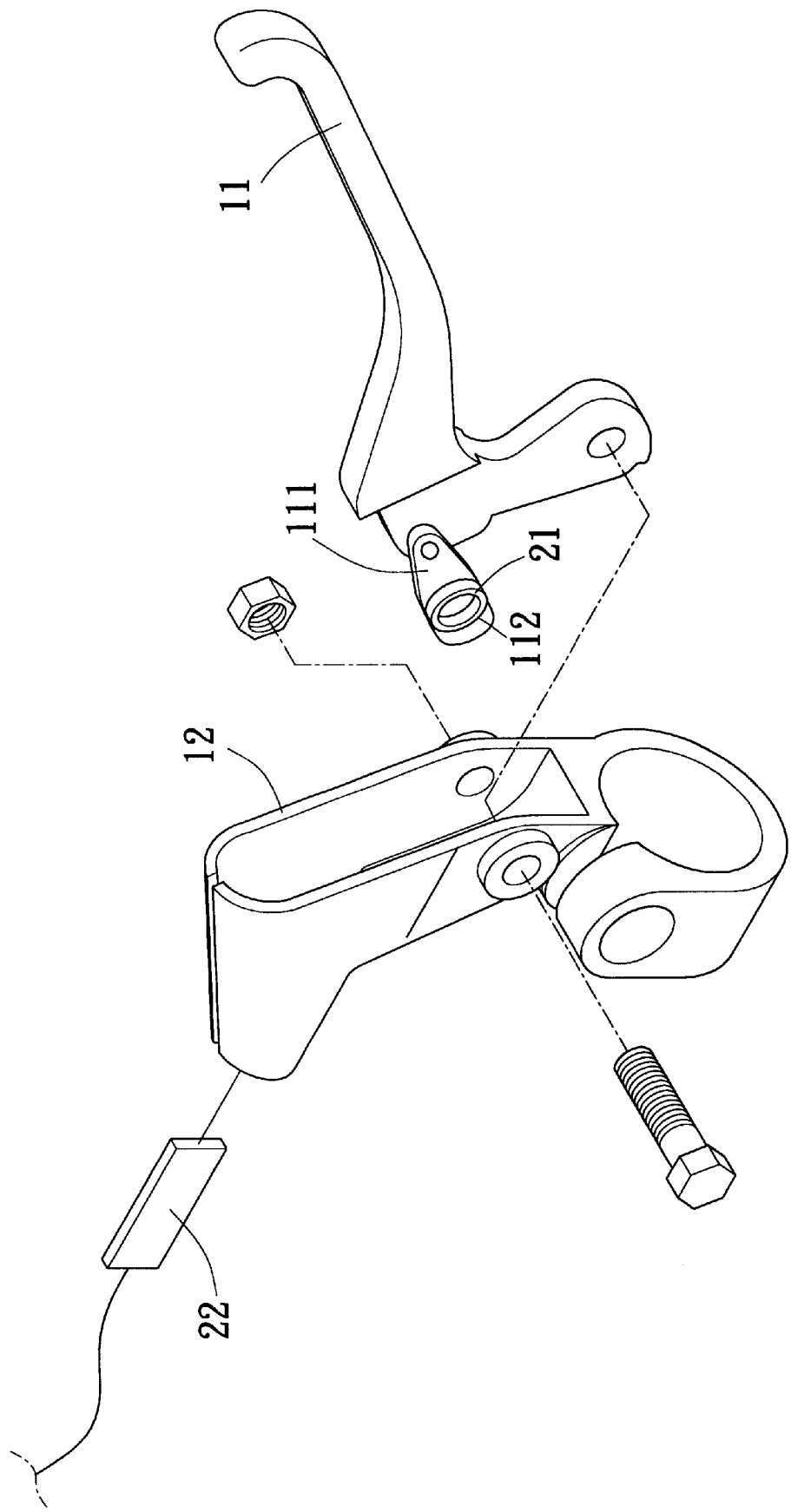
FIG. 1 is a perspective exploded view of the lever bar activation detecting structure of the present invention.
Figure 2:
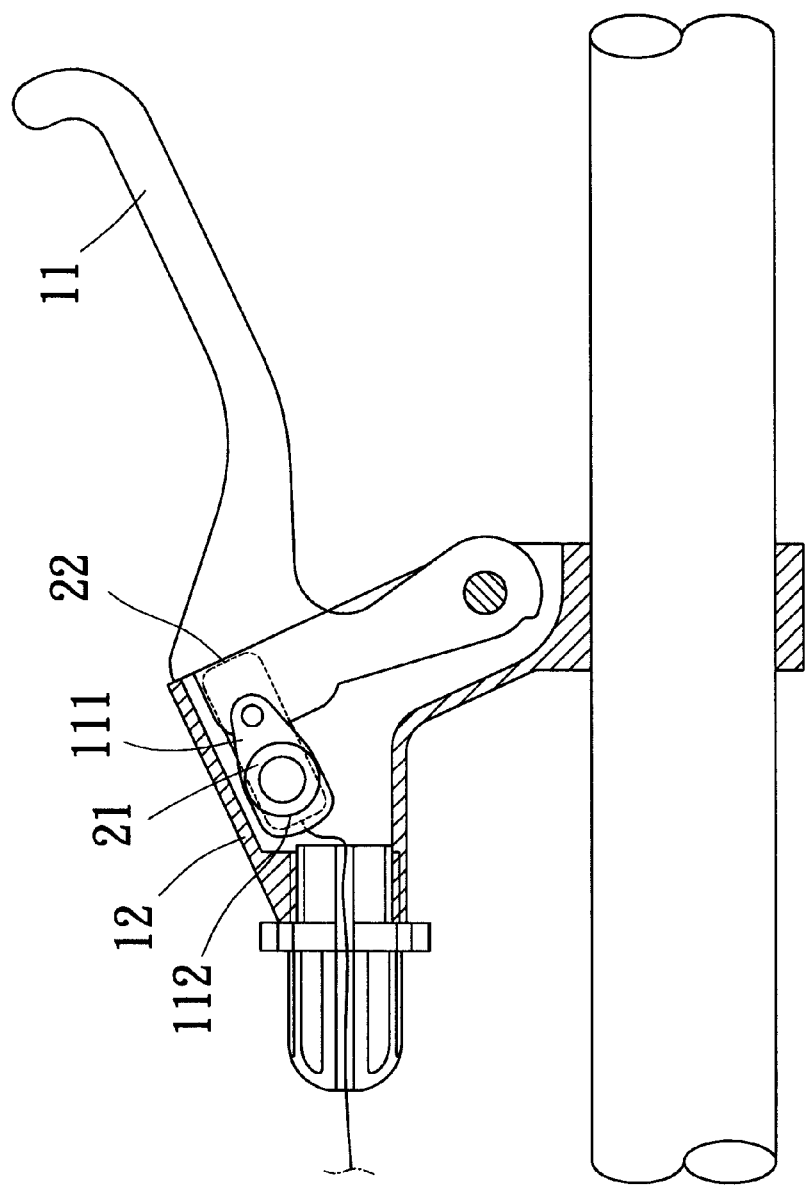
FIG. 2 is a partially sectional assembled view of the lever bar activation detecting structure of the present invention.
Figure 3:
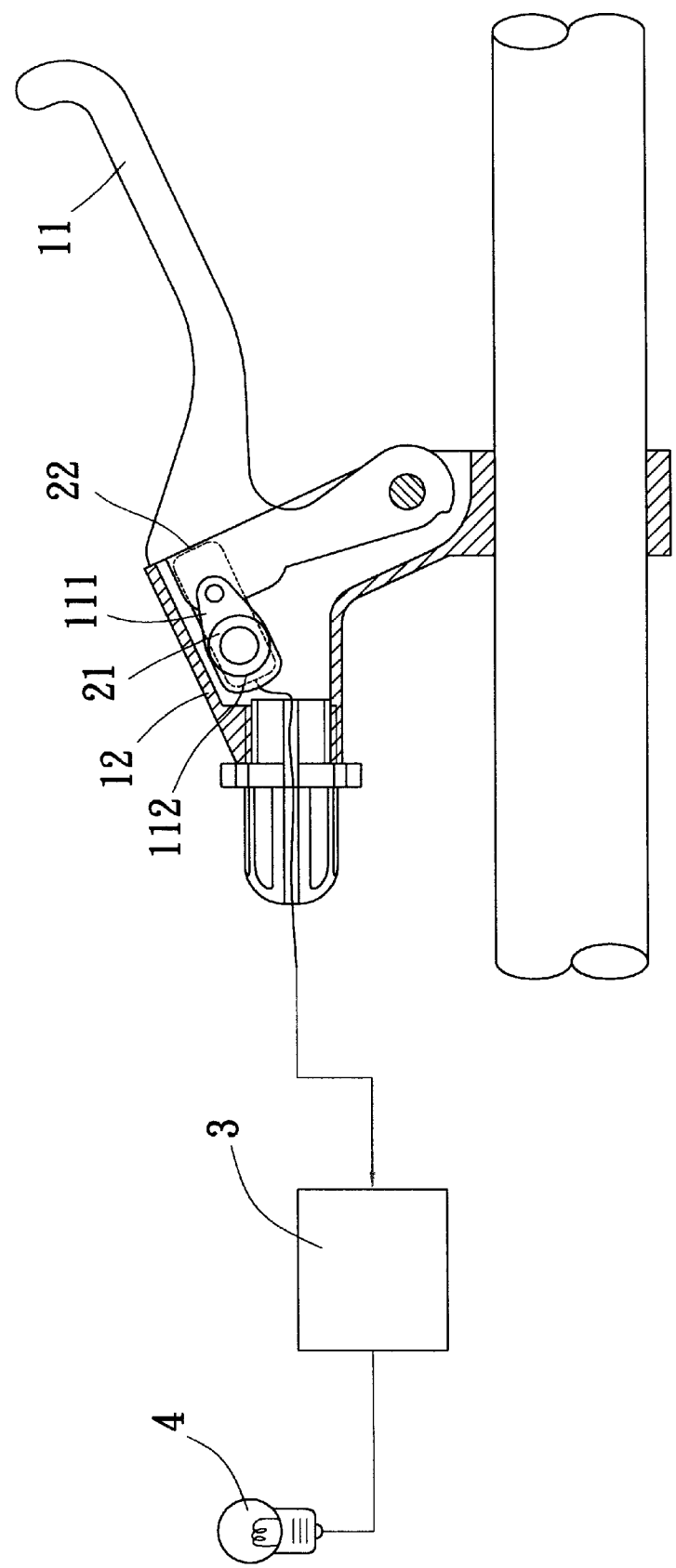
FIG. 3 shows that the lever bar activation detecting structure of the present invention is applied to a brake lever bar of an electric bicycle.
Figure 4:
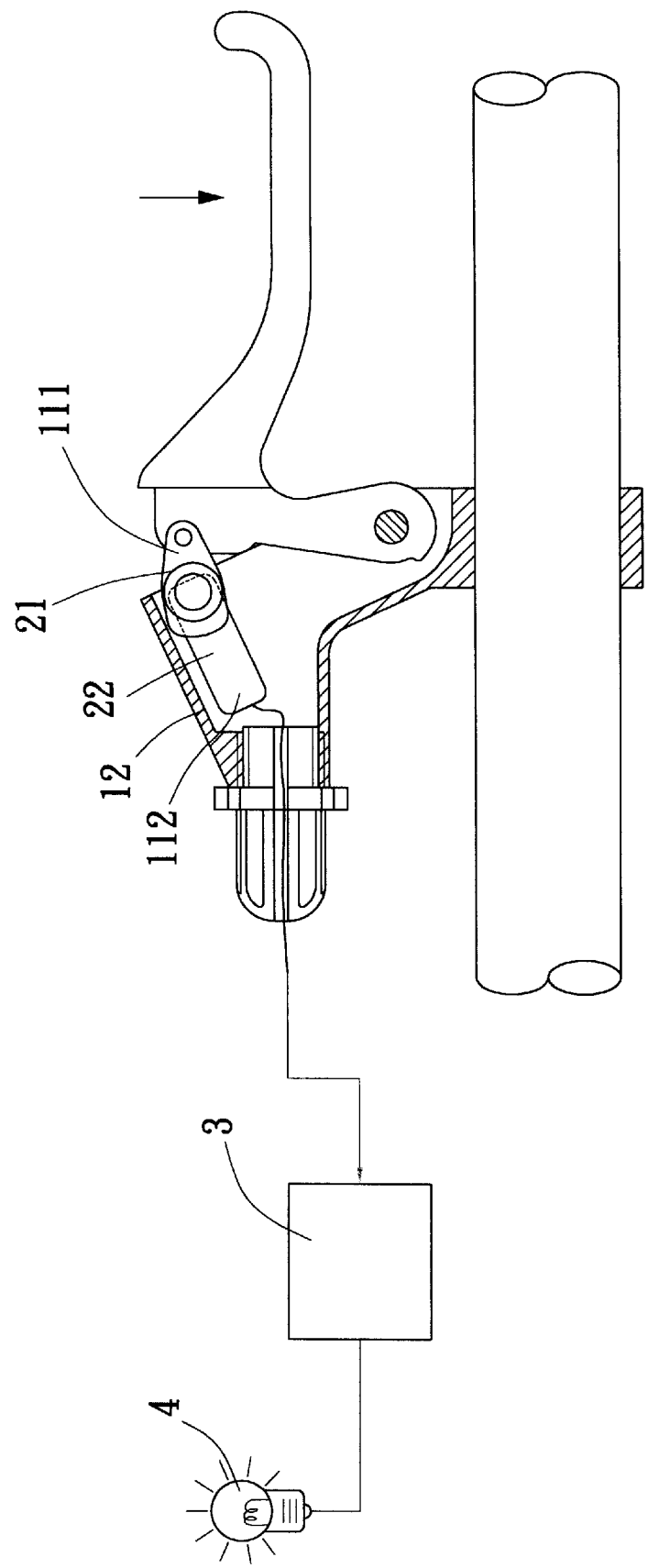
FIG. 4 is a view according to FIG. 3, in which the brake lever bar is pressed down to turn on the indicating light.

Please refer to FIGS. 1 and 2. The lever bar activation detecting structure of the present invention is used for detecting the braking operation of an electric two-wheel vehicle, including a lever bar 11 and a lever bar pivot scat 12 with which the lever bar 11 is pivotally connected. A magnet 21 and a magnetic switch 22 are respectively disposed on the two members.

The front side of the lever bar 11 is formed with a pivot hole for pivotally connecting the lever bar 11 in the pivot seat 12. The front side of the lever bar 11 is connected with a cord tying block 111 formed with a reservation section 112.

The magnet 21 is a strong magnetic ring such as neodymiumironboron and disposed at the reservation section 112 to be move along with the lever bar 11.

The magnetic switch 22 is disposed in the pivot seat 12 and is a common magnetic switch. The position of the magnetic switch 22 is opposite to that of the magnet 21. When the lever bar 11 is not moved, a magnetic balance is achieved to keep in a cut off state.

The above detecting structure has less parts and can be easily assembled to lower the cost. In addition, the exposed magnet 21 and the magnetic switch 22 have excellent waterproof effect so that it is unnecessary to consider the watertight issue and the assembly can be easily completed. FIGS. and 4 show the application of the present invention. When the lever bar 11 is not shifted, the magnet 21 is positioned at a reaction position of the magnetic switch 22 so that there is no action. At this time, the indicating light 4 is not turned on, while when the lever bar 11 is pressed, the magnet 21 is turned about the pivot hole of the lever bar 11 to spread die reaction range of the magnetic switch 22 so that the magnetic switch 22 is energized to generate a signal which is detected and identified by the controlling unit 3 for turning on the indicating light 4.

Figure 5:
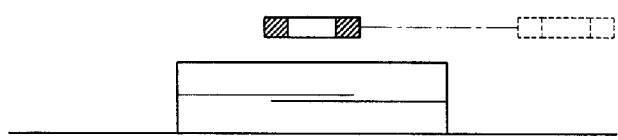
FIG. 5 shows that the magnetic ring is parallelly transversely moved along the magnetic switch of the present invention.
Figure 6:
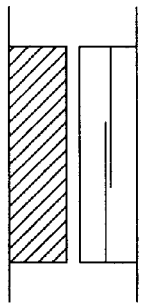
FIG. 6 shows the operation of a conventional magnetic switch.
Figure 6:
Figure 6:
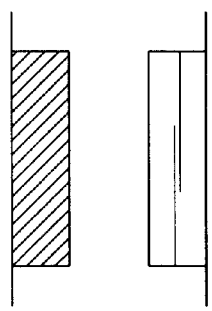

As shown in FIGS. 2 and 5, the present invention is characterized in that the magnet 21 and the magnetic switch 22 are transversely arranged opposite to each other. This is totally different from the conventional magnetic switch as shown in FIG. 6 in which the magnet is pulled away from the magnetic switch. When the lever bar 11 is shifted, the magnet 21 is turned about the pivot hole and parallelly transversely moved along the magnetic switch so that the electrical connection distance is longer. The distance is in direct proportion to the shifting travel of the lever bar 11 and falls within the maximum travel thereof so that the activation of the brake lever bar can be truly reflected to turn on the indicating light.

The above embodiment is only used to illustrate the present invention, not intended to limit the scope thereof Many modifications of the above embodiment can be made without departing from the spirit of the present invention.

What is claimed is:

1. A lever bar activation detecting structure comprising a lever bar and a lever bar pivot seat, the lever bar is pivotally connected to the lever bar pivot seat, a magnet and a magnetic switch having an excellent waterproof effect and being respectively disposed on the lever bar and the lever bar pivot seat with the magnet being arranged adjacent the magnetic switch, the magnet and magnetic switch having surfaces facing one another, the surfaces of the magnet and magnetic switch being parallel to one another; the magnet and the magnetic switch being arranged, so that when the lever bar is pressed, the magnet is moved relative to the magnetic switch while maintaining the respective surfaces of the magnet and magnetic switch parallel to one another and the magnetic switch is energized to generate a signal; the signal being detected and identified by a controlling unit for turning on an indicating light.

2. The lever bar activation detecting structure as claimed in claim 1, wherein a front side of the lever bar is formed with a pivot hole for pivotally connecting the lever bar in the pivot seat, the front side of the lever bar being connected with a cord tying block formed with a reservation section on which the magnet is disposed, the magnet being a strong magnetic stone, the magnetic switch being disposed in the pivot seat at a position opposite to that of the magnet, whereby when the lever bar is not moved, a magnetic balance is achieved to keep in a cut off state.

3. The lever bar activation detecting structure as claimed in claim 2, wherein the detecting structure is used for detecting the braking operation of an electric two-wheel vehicle.

4. The lever bar activation detecting structure as claimed in claim 1, wherein the magnet is a neodymiumironboron magnetic ring; and wherein when the lever bar is pressed, the magnetic ring is turned about the pivot hole and moved in a direction parallel to the surface of the magnetic switch with electric connection distance in direct proportion to shifting travel of the lever bar and falling within maximum travel thereof.

5. A lever bar activation detecting structure comprising a lever bar and a lever bar pivot seat, the lever bar is pivotally connected to the lever bar pivot seat, a magnet and a magnetic switch having an excellent waterproof effect and being respectively disposed on the lever bar and the lever bar pivot seat with the magnet being arranged adjacent the magnetic switch, the magnet and magnetic switch having surfaces facing one another; the magnet and the magnetic switch being arranged, so that when the lever bar is pressed, the magnet is moved parallel to the magnetic switch and the magnetic switch is energized to generate a signal; the signal being detected and identified by a controlling unit for turning on an indicating light.

* * * * *